(12) United States Patent
Marcone

(10) Patent No.: US 6,619,023 B1
(45) Date of Patent: *Sep. 16, 2003

(54) SHOVEL RAKE

(76) Inventor: Louis J. Marcone, 3865 Culver Rd., Rochester, NY (US) 14622

( * ) Notice: Subject to any disclaimer, the term of this patent is extended or adjusted under 35 U.S.C. 154(b) by 0 days.

This patent is subject to a terminal disclaimer.

(21) Appl. No.: 10/079,314

(22) Filed: Feb. 20, 2002

Related U.S. Application Data

(63) Continuation-in-part of application No. 09/625,036, filed on Jul. 24, 2000, now Pat. No. 6,367,236.

(51) Int. Cl.[7] .................................................. A01D 7/10
(52) U.S. Cl. ................................... 56/400.12; 294/50.6
(58) Field of Search ......................... 56/400.04, 400.06, 56/400.07, 400.12, 400.16, 400.2; 294/51, 50.6, 50.8, 50.9

(56) References Cited

U.S. PATENT DOCUMENTS

| | | | | |
|---|---|---|---|---|
| 2,891,374 A | * | 6/1959 | Richmond | |
| 5,303,536 A | * | 4/1994 | Tolliver | |
| 5,564,267 A | * | 10/1996 | Bricker et al. | |
| 5,788,299 A | * | 8/1998 | Wilkinson | |
| 5,881,545 A | * | 3/1999 | Wilson | |
| 5,901,540 A | * | 5/1999 | Vella | |
| 5,918,920 A | * | 7/1999 | Tamburro, Sr. | |
| 6,134,869 A | * | 10/2000 | Barrett | |

* cited by examiner

Primary Examiner—Robert E. Pezzuto
(74) Attorney, Agent, or Firm—Basch & Nickerson LLP; Duane C. Basch

(57) ABSTRACT

A combination shovel and lawn rake and, includes a hollow rake handle with a rake head pivotally mounted on its lower end with a multi-point linkage for movement between a rake position and a raised position. A rake control knob near the handle is effective to move the rake head between a rake position and a raised position. A shovel is pivotally connected to the rake handle for movement between a shovel position and a storage position, where spring clips secure the shovel handle to the rake handle in both positions and a release mechanism aids in the release of the shovel from the clips so as to allow a change in its position.

19 Claims, 6 Drawing Sheets

SHOVEL RAKE

CROSS REFERENCE

The following related application is hereby incorporated by reference for its teachings, a continuation-in-part of application for a "RAKE AND SHOVEL COMBINATION," by L. Marcone, application Ser. No. 09/625,036, filed Jul. 24, 2000 now U.S. Pat. No. 6,367,236, ("MARCONE").

BACKGROUND AND SUMMARY OF THE INVENTION

This invention relates generally to a combination shovel and rake implement, and more particularly to improvements to a combination shovel and rake implement, including shovel locking means and a handle-mounted mechanism for controlling the position of the rake.

Lawn raking typically involves using a rake to gather leaves, grass cuttings or other material and debris into piles, then using a separate implement such as a shovel or pitchfork to load the piled debris onto a sheet or into a container for transport to the roadside.

This alternating use of rake and shovel requires the worker repeatedly to set one tool down and pick up the other. This is not only fatiguing, but for people with back trouble, it may be difficult and painful. Accordingly, the present invention is directed to further improvements in a shovel and rake combination, where the shovel may be locked in a raking or shoveling position, and where the angle of the rake may be controlled at an upper handle of the implement so as to enable a user to easily pick up debris on the shovel and hold that debris thereon with the rake head.

In accordance with the present invention, there is provided a shovel and lawn rake apparatus, including: a hollow tube with a D-shaped handle affixed to an upper end thereof and a rake head pivotally mounted to the lower end thereof, for movement between a rake position and a raised position; a rake control knob mounted adjacent the D-shaped handle, said knob being operatively connected to said rake head to move said rake head between said rake position and said raised position; a shovel including a shovel handle with a shovel head on the lower end thereof, said shovel handle pivotally connected to said tube for movement between a shovel position and a storage position, wherein the shovel handle is connected to the tube at a location spaced-apart from the rake head end: thereof and where the shovel handle traverses an obtuse angle as it is pivoted between the shovel position and the storage position; and locking means to secure said shovel handle to said tube alternatively in said shovel position and said storage position.

In accordance with another aspect of the present invention, there is provided a shovel and lawn rake apparatus, including: a hollow tube with a rake head pivotally mounted on the lower end thereof, on an axis perpendicular to said tube, for movement between a rake position and a raised position; a rake control means operatively connected to said rake head, whereby said control means is effective to move said rake head between said rake position and said raised position; a shovel including a shovel handle with a shovel head on the lower end thereof, said shovel handle pivotally connected to said tube for movement of said shovel head between a shovel position and a storage position wherein the shovel handle is connected to the rake handle at a location spaced-apart from the rake head end thereof and where the shovel handle traverses an obtuse angle as it is pivoted between the shovel position and the storage position; and lock/release means to secure said shovel handle to said tube alternatively in said shovel position and said storage position.

A combination lawn rake and shovel, according to this invention includes a rake handle with a rake head pivotally mounted on its lower end for movement between a rake position and a raised position. A control mechanism near the rake handle is operatively connected to the pivoting rake head via a linkage to move the rake head between its rake position and its raised position. Furthermore, the improved linkage mechanism provides for sufficient range of movement of the rake head so as to make it practical to use to grip debris loaded onto a shovel pivotally connected to the rake for movement between a shovel position and a storage position. Moreover, the shovel includes a locking mechanism to secure the shovel handle to the rake in both its shovel position and its storage position.

One aspect of the invention is based on the observation of problems with conventional rakes and shovels, and their use in the collection and removal of debris from a yard—particularly the need for at least two implements. This aspect is based on the discovery of a technique that alleviates these problems by combining the functionality of the rake and the shovel in a common implement. This technique can be implemented, for example, in accordance with aspects of the present invention, particularly including further improvements with respect to the functionality of the rake head and shovel.

Figure 1:
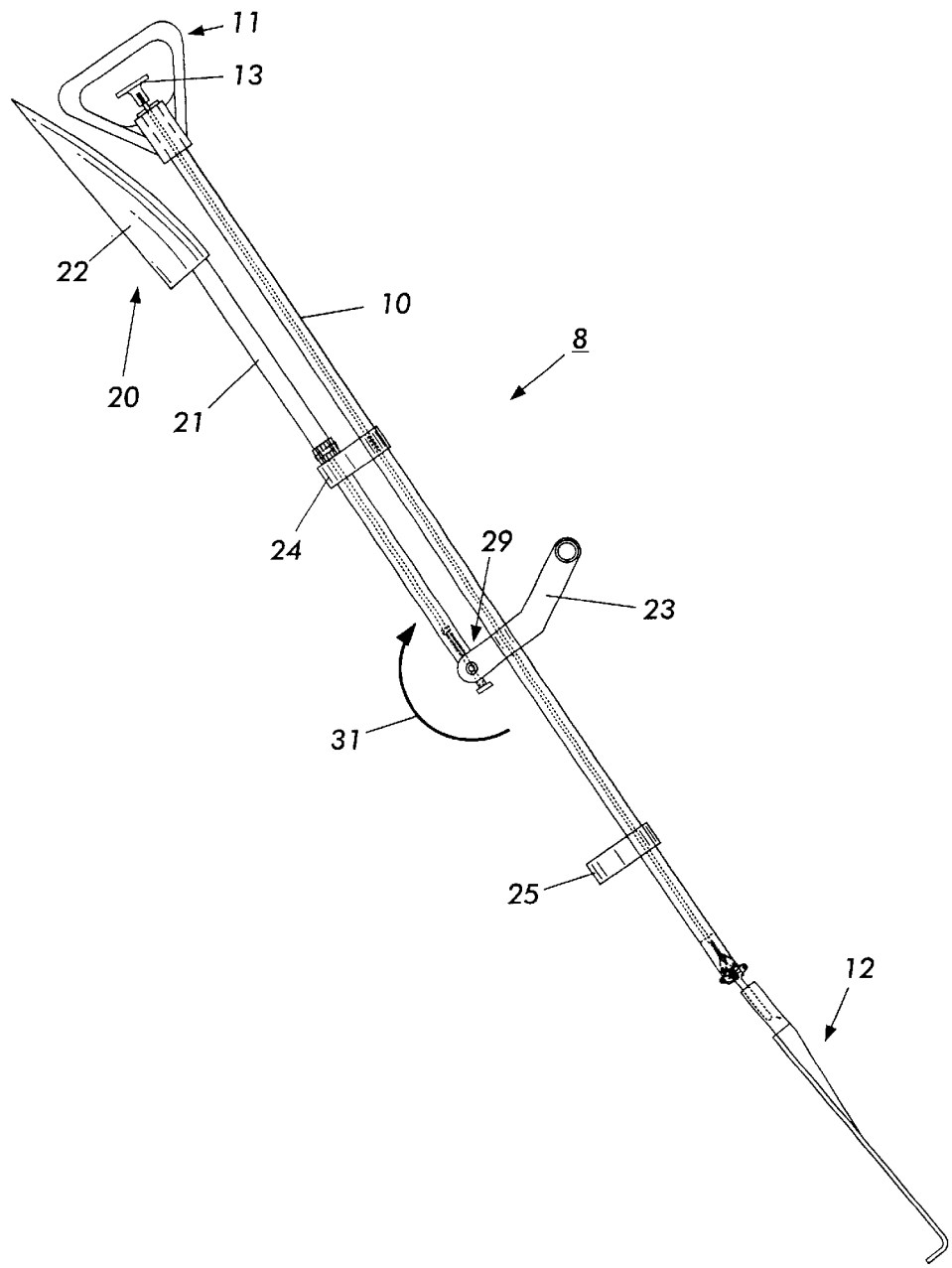
FIG. 1 is a side view of the shovel rake, in accordance with one aspect of the present invention, in condition for raking.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "shovel" is used to represent a substantially continuous surface employed for picking material or debris from a surface. The term "shovel," in addition to a continuous-bladed implement, is intended to include a finely-tined fork as is commonly used for handling silage, for example.

The term "rake" is meant to represent a multi-toothed or pronged device wherein the teeth extend from a common support. The teeth are generally made of flexible yet resilient materials such as plastics, metal and bamboo. In one embodiment, the teeth may include a curve or angle at the non-supported end thereof.

Figure 2:
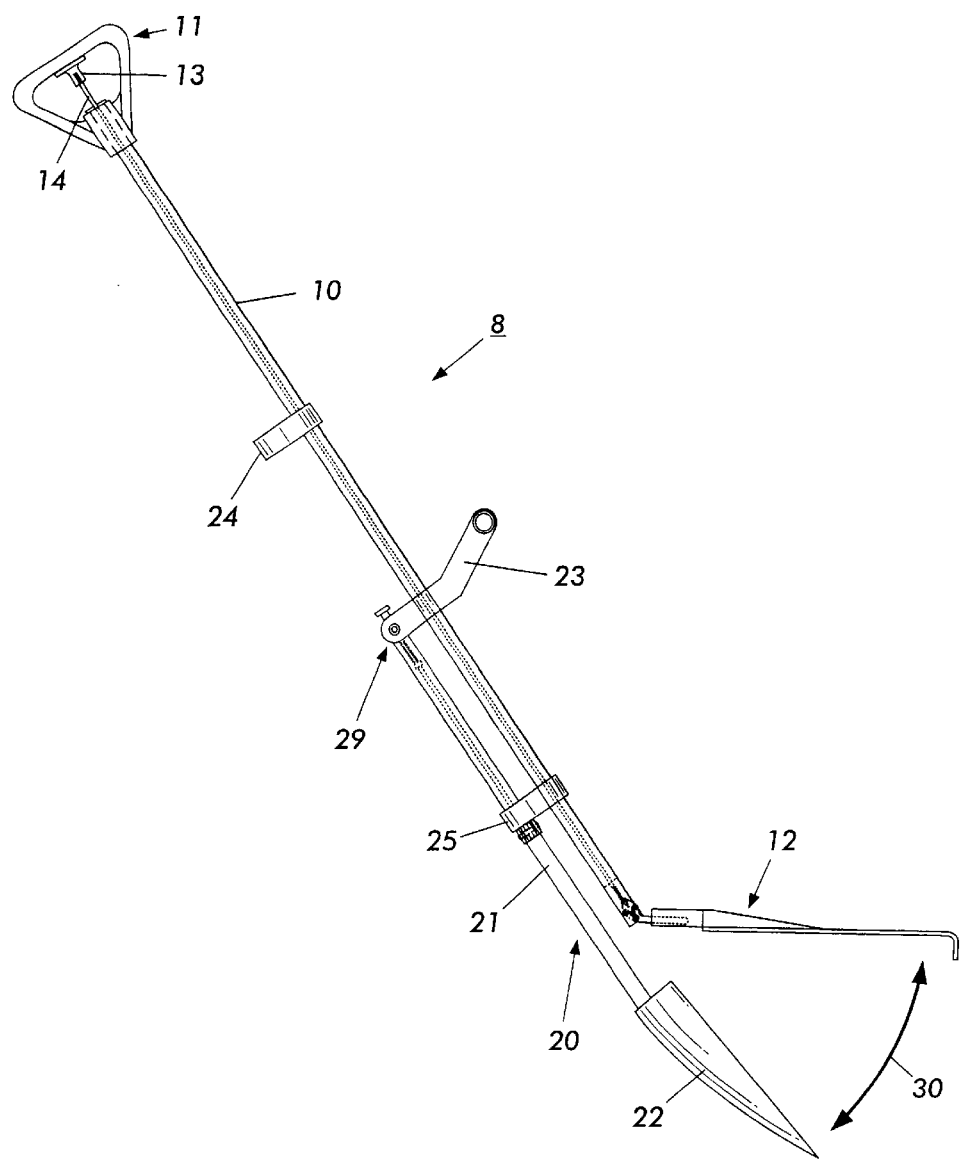
FIG. 2 is a side view of the shovel rake of FIG. 1 in condition for shoveling, or picking up, piles of raked leaves or grass.
Figure 3:
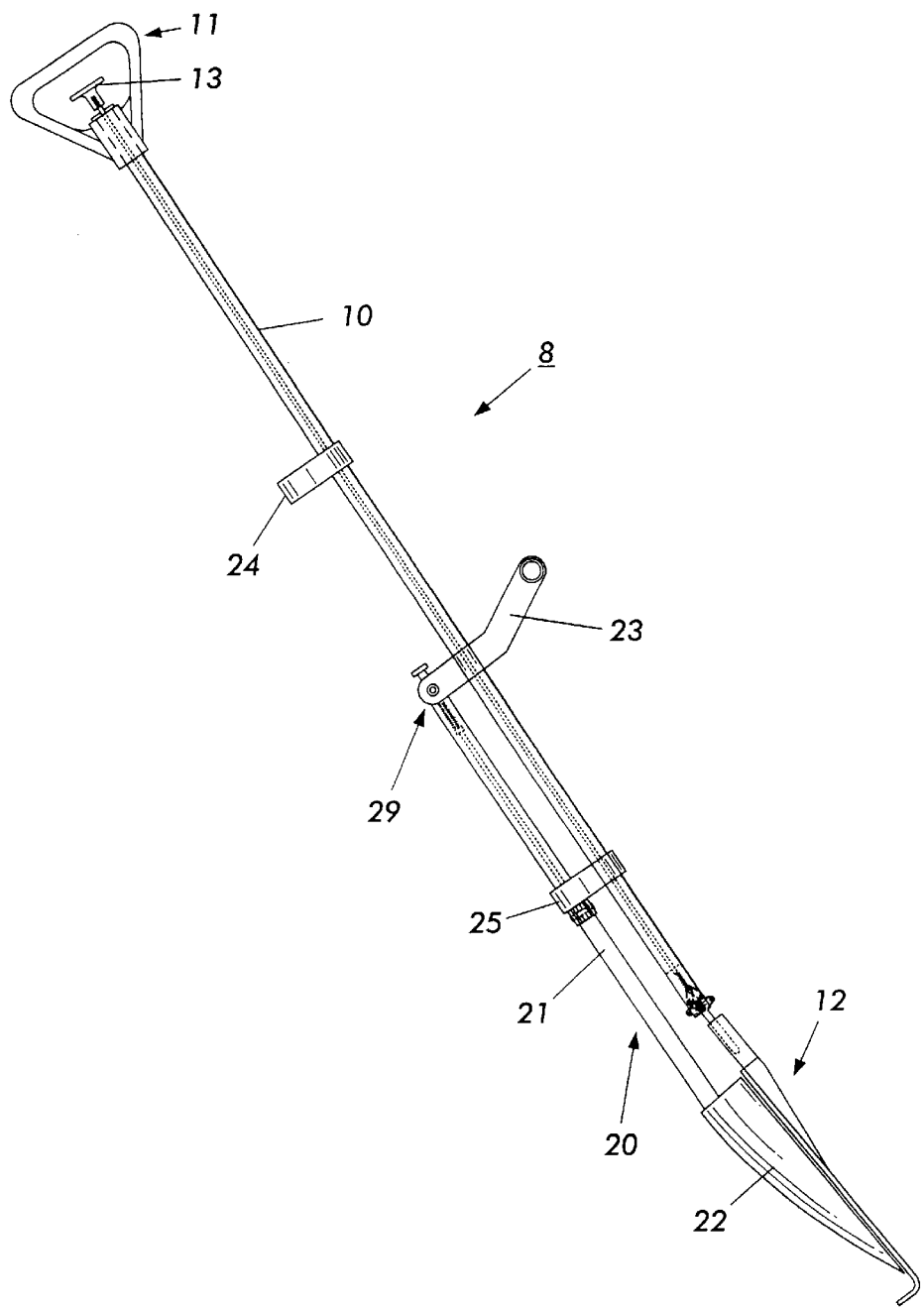
FIG. 3 is a side view of the shovel rake of FIG. 1 in condition to secure a load of leaves or grass within the grasp thereof.

Referring to FIGS. 1–3, the shovel rake implement 8 includes an elongated hollow tube 10 with a D-shaped handle or grip 11 on its upper end. As illustrated in the figures, handle 11 is depicted in a rotated manner to show the detail of the inner handle and an associated rake-angle knob (see FIG. 5). A rake head 12 is mounted on the lower end of the tube 10 for pivotal movement, indicated by the arrow 30, between a nominal working or rake position as shown in FIG. 1 and a raised position as shown in FIG. 2. Pivotal movement is about 40°- to about 50° between the rake position (FIG. 1) and raised position (FIG. 2) of the rake head 12.

Figure 5:
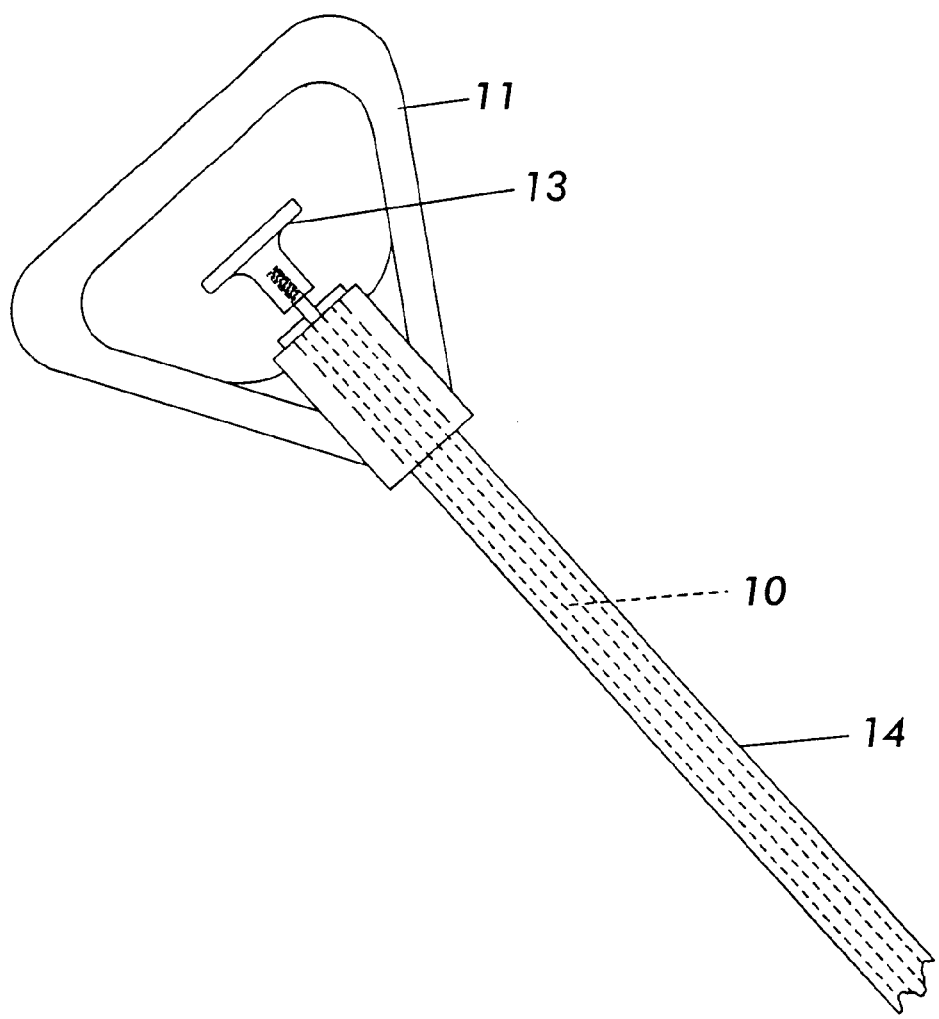
FIG. 5 is an enlarged view of the D-shaped handle and rake angle control knob of FIGS. 1–3.

A rake control mechanism, as will be described in more detail with respect to FIGS. 5 and 6, includes a rake-angle control knob 13 preferably mounted within the confines of the D-handle 11 at the top of the tube 10, and connected to the upper end of a push-pull control rod 14 within the tubular tube 10. A shovel 20 includes a handle 21 and a shovel head 22, which may be either solid or tined. The shovel handle 21 is pivotally mounted to the tube 10 by a lift handle assembly 23 at an intermediate location on the tube 10. Lift handle assembly 23 includes a handle, or similar means for holding the implement, on a top or upper side thereof that may be grasped by the user while using the shovel rake in any configuration. And, the handle assembly 23 also preferably extends beyond the tube 10, on the lower side of the implement, to provide a pivot or hinge point 29 for the shovel 20. As depicted in FIG. 1, the shovel 20 is swung up to an out-of-the-way "storage" position, and secured to the tube 10 by an upper spring clip 24. In FIG. 2, the shovel 20 is swung down to its working or shovel position, and secured to the tube 10 by a lower spring clip 25.

Figure 4:
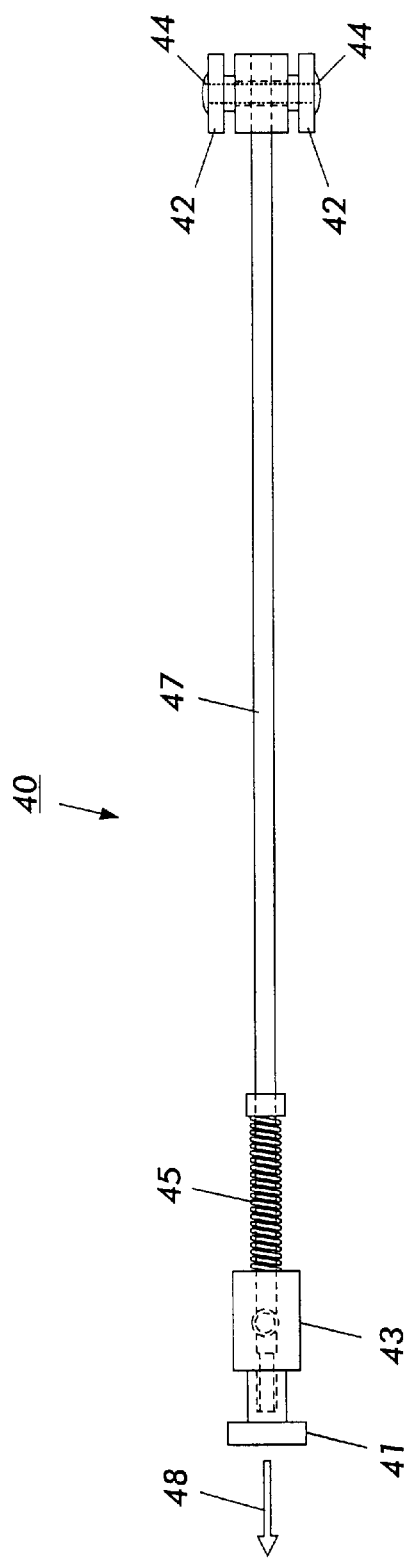
FIG. 4 is a detailed illustration of a shovel handle release mechanism in accordance with an aspect of the present invention.

Referring also to FIG. 4, the detail of the shovel rake lock/release mechanism or means is illustrated in more detail. Lock-release mechanism 40 is preferably incorporated with the hollow tube handle 21 of the shovel 20. Mechanism 40 includes a shovel release knob 41, a pivot block 43, a shovel spring 45 and a release rod 47. At an end of the release rod, opposite the shovel release knob 41, there are a pair of release rings 42, of which the outer surfaces 44 are placed in contact with spring clips 24 and 25 when the shovel release knob is pulled in the direction indicated by arrow 48. Thus, the lock/release mechanism 40 may be employed to releasably lock the shovel in either the shovel position (FIGS. 2 and 3) or the storage position (FIG. 1). In other words, with the shovel in the shovel position of FIGS. 2 and 3, upon pulling shovel release knob 41 in the direction of arrow 48 allows the shovel to pivot about point 29, in the direction of arrow 31, to the storage position. When the shovel release knob is held in its relaxed position, via spring 45, the mechanism does not interfere with clips 24 or 25, and the shovel remains in its respective position.

Returning to FIGS. 2 and 3, the use of the shovel rake will be briefly described. Consider the shovel head 22 as containing a load of debris such as leaves or grass. To secure the load on the shovel for lifting by the user, the rake head is preferably "lowered" from the position of FIG. 2 to the "rake" position of FIG. 3, thereby closing down on the debris and it in place in the shovel so the user can easily and cleanly lift the debris and dump it into a container.

Having described the basic operation of the rake mechanism in accordance with FIGS. 1–3, attention is now turned to FIGS. 5 and 6, where further detail of the components and operation of the rake linkage will be described. Considering FIGS. 5 and 6 in conjunction with FIG. 1, the lower end of the control rod 14 extends out of the lower end of the tube 10, and is connected, by a compression spring 16, to a multi-point linkage 15, which in turn is connected to the rake head 12. In the figures, the control knob 13 is positioned at the end of the tube 10, preferably within D-handle 11. In this manner the user is able to grasp and pull the rake control knob 13 while holding onto the end of the implement 8. Pulling the knob and control rod 14 upward collapses the multi-point linkage 15 into the position shown by the dashed lines, thereby rotating the L-shaped arm from an initial position to a raised position and covering an angle of 40°–50° as indicated by arrow 64. As the L-shaped arm 60 is fixedly connected to the rake head, the movement of the arm necessarily results in a similar raising and lowering of the rake head. Upon release of the knob, the spring 16 forces the multi-point linkage back to a nominal position where the rake head would be in a raking position. It will be appreciated that In FIG. 2, the control lever 13 is pulled up, pushing the control rod 14 downward against the linkage 15, and swinging the rake head 12 up to its raised position.

Figure 6:
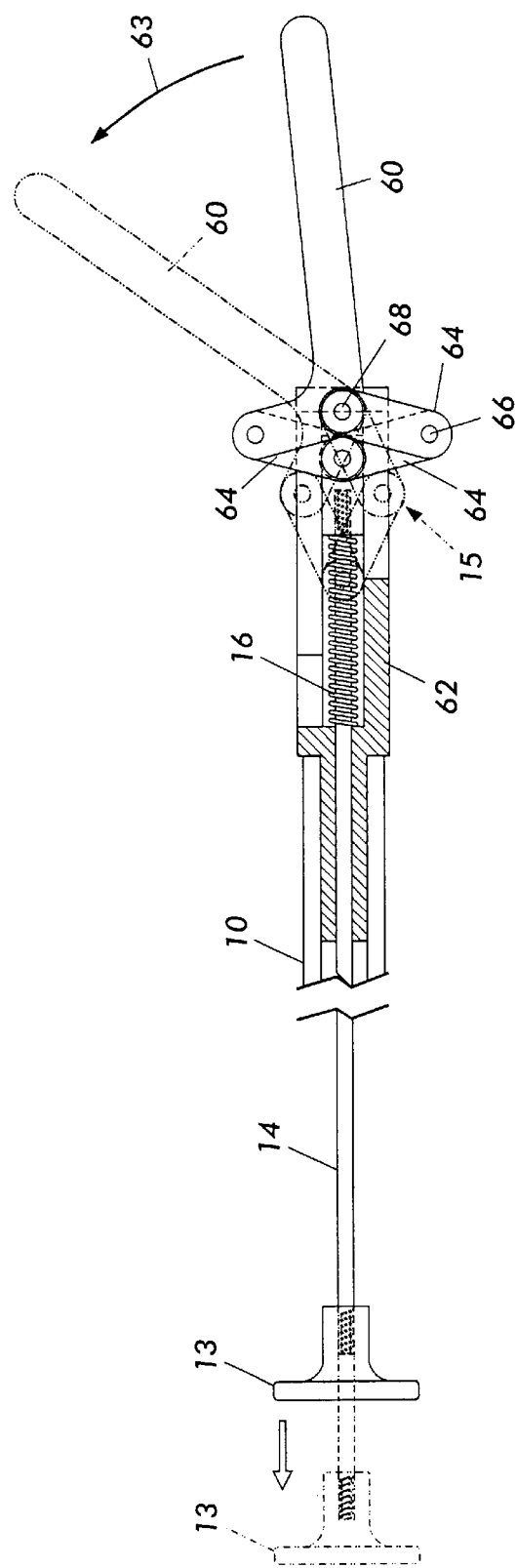
FIG. 6 is a detailed view of the multi-point linkage employed in accordance with an aspect of the present invention.

As shown in further detail in FIG. 6, the multi-point linkage 15 is comprised of three links 64 plus the L-shaped arm 60, each link or arm being attached at two points via a pivot, for example pivot 66. It will be appreciated that the pivot for the L-shaped arm 60 must be a fixed pivot 68, fixed relative to the rake mount block 62 that is affixed to the end of tube 10. In that way, a force pulling on rod 14 will serve to compress spring 16 and collapse the linkage, thereby rotating the L-shaped arm about fixed pivot 68.

In recapitulation, the present invention is a combination shovel and lawn rake that, includes a hollow rake handle with a rake head pivotally mounted on its lower end with a multi-point linkage for movement between a rake position and a raised position. A rake control knob near the handle is effective to move the rake head between a rake position and a raised position. A shovel is pivotally connected to the rake handle for movement between a shovel position and a storage position, where spring clips secure the shovel handle to the rake handle in both positions and a release mechanism aids in the release of the shovel from the clips so as to allow a change in its position.

It is, therefore, apparent that there has been provided, in accordance with the present invention, an improved implement that serves both as a shovel and lawn rake, and combines the functionality to improve the uses therefor. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A combination shovel and lawn rake apparatus, including:
    a hollow tube with a D-shaped handle affixed to an upper end thereof and a rake head pivotally mounted to the lower end thereof, for movement between a rake position and a raised position;

a rake control knob mounted adjacent the D-shaped handle, said knob being operatively connected to said rake head to move said rake head between said rake position and said raised position;

a shovel including a shovel handle with a shovel head on the lower end thereof, said shovel handle pivotally connected to said tube for movement between a shovel position and a storage position, wherein the shovel handle is connected to the tube at allocation spaced-apart from the rake head end thereof and where the shovel handle traverses an obtuse angle as it is pivoted between the shovel position and the storage position; and locking means to secure said shovel handle to said tube alternatively in said shovel position and said storage position.

2. The apparatus of claim 1, in which said locking means includes upper and lower spring clips mounted on said tube for receiving said shovel handle.

3. The apparatus of claim 2, further including a release mechanism for dislodging the shovel handle from said upper and lower spring clips.

4. The apparatus of claim 1, further including a lift handle affixed midway on said tube.

5. The apparatus of claim 4, wherein said lift handle further comprises a pivot block for pivotally connecting said shovel handle to said tube.

6. The apparatus of claim 1, further including a multi-point linkage mechanism for pivotally mounting the rake head to the end of the handle.

7. The apparatus of claim 6, wherein the multi-point linkage mechanism further includes an L-shaped arm to which said rake head is attached.

8. The apparatus of claim 6, wherein the multi-point linkage mechanism is spring loaded so as to return the rake head to a nominal rake position.

9. A shovel and lawn rake apparatus, including:

a hollow tube with a rake head pivotally mounted on the lower end thereof, on an axis perpendicular to said tube, for movement between a rake position and a raised position;

a rake control means operatively connected to said rake head, whereby said control means is effective to move said rake head between said rake position and said raised position;

a shovel including a shovel handle with a shovel head on the lower end thereof, said shovel handle pivotally connected to said tube for movement of said shovel head between a shovel position and a storage position wherein the shovel handle is connected to the rake handle at a location spaced-apart from the rake head end thereof and where the shovel handle traverses an obtuse angle as it is pivoted between the shovel position and the storage position; and lock/release means to secure said shovel handle to said tube alternatively in said shovel position and said storage position.

10. The apparatus of claim 9, wherein said lock/release means includes a locking spring clip and a release mechanism incorporated with the shovel handle.

11. The apparatus of claim 10, wherein said release mechanism further includes a shovel knob, a pivot block, a shovel spring and a release rod connected to a pair of release rings and where said release rings serve to disengage the shovel handle from said spring clip.

12. The apparatus of claim 9, further including a handle at an upper end of said tube.

13. The apparatus of claim 12, wherein said handle is D-shaped.

14. The apparatus of claim 9, further including a multi-point linkage mechanism for pivotally mounting the rake head to the end of the handle.

15. The apparatus of claim 14, wherein the multi-point linkage mechanism further includes an L-shaped arm to which said rake head is attached.

16. The apparatus of claim 14, wherein the multi-point linkage mechanism is spring loaded so as to return the rake head to a nominal rake position.

17. The apparatus of claim 16, wherein a position of the multi-point linkage mechanism is controlled by the displacement of a rake angle control knob operatively associated with said linkage, and wherein said rake angle control knob is positioned at an upper end of said tube in association with a handle affixed on the end of said tube.

18. The apparatus of claim 9, further including a lift handle affixed midway on said tube.

19. The apparatus of claim 18, wherein said lift handle further comprises a pivot block for pivotally connecting said shovel handle to said tube.

\* \* \* \* \*